US010382992B2

(12) United States Patent
Sahin et al.

(10) Patent No.: US 10,382,992 B2
(45) Date of Patent: Aug. 13, 2019

(54) INTERFERENCE MEASUREMENTS AND MANAGEMENT IN DIRECTIONAL MESH NETWORKS

(71) Applicant: IDAC HOLDINGS, INC., Wilmington, DE (US)

(72) Inventors: Onur Sahin, Brooklyn, NY (US); Arnab Roy, East Norriton, PA (US); Yugeswar Deenoo, King of Prussia, PA (US); Ravikumar V. Pragada, Collegeville, PA (US); Philip J. Pietraski, Jericho, NY (US); Joseph S. Levy, Merrick, NY (US); Tao Deng, Roslyn, NY (US)

(73) Assignee: IDAC HOLDINGS, INC., Wilmington, DE (US)

(*) Notice: Subject to any disclaimer, the term of this patent is extended or adjusted under 35 U.S.C. 154(b) by 16 days.

(21) Appl. No.: 14/766,044

(22) PCT Filed: Feb. 5, 2014

(86) PCT No.: PCT/US2014/014898
§ 371 (c)(1),
(2) Date: Aug. 5, 2015

(87) PCT Pub. No.: WO2014/124024
PCT Pub. Date: Aug. 14, 2014

(65) Prior Publication Data
US 2015/0373572 A1 Dec. 24, 2015

Related U.S. Application Data

(60) Provisional application No. 61/761,978, filed on Feb. 7, 2013, provisional application No. 61/874,739, filed on Sep. 6, 2013.

(51) Int. Cl.
H04W 24/02 (2009.01)
H04W 24/10 (2009.01)
(Continued)

(52) U.S. Cl.
CPC .......... *H04W 24/10* (2013.01); *H04W 16/10* (2013.01); *H04W 16/30* (2013.01); *H04W 24/02* (2013.01);
(Continued)

(58) Field of Classification Search
CPC ..... H04W 16/10; H04W 84/18; H04W 16/28; H04B 7/0617
See application file for complete search history.

(56) References Cited

U.S. PATENT DOCUMENTS 6,640,104 B1 * 10/2003 Borst ............... H04B 7/086
455/422.1
7,321,316 B2 * 1/2008 Hancock ............... H04Q 9/00
340/870.02
(Continued)

FOREIGN PATENT DOCUMENTS

WO 2009/153817 12/2009

OTHER PUBLICATIONS

Pathak et al., "A Survey of Network Design Problems and Joint Design Approaches in Wireless Mesh Networks," IEEE Communications Surveys and Tutorials, vol. 13, No. 3, pp. 396-428 (Jul. 2011).
(Continued)

Primary Examiner — Andrew Lai
Assistant Examiner — Chuong M Nguyen
(74) Attorney, Agent, or Firm — Volpe and Koenig, P.C.

(57) ABSTRACT

Techniques may be used for interference measurement and management in directional mesh networks, including centralized and/or distributed approaches. A centralized node,
(Continued)

such as an operations and maintenance (OAM) center, may use feedback from nodes in the mesh network to partition the nodes in the mesh network into clusters based on interference levels. Interference measurement reports may be used by the centralized node to update cluster membership. An initiating node in the mesh network may use topographical information to generate an initial interference cluster, and interference measurement frame (IMF) scheduling information may be used to schedule transmissions within the interference clusters. Techniques for opportunistic measurement campaigns, simultaneous measurement campaigns, link failure detection, and link re-acquisition in directional mesh networks may also be used.

10 Claims, 18 Drawing Sheets

(51) Int. Cl.
*H04W 16/10* (2009.01)
*H04W 72/12* (2009.01)
*H04W 16/30* (2009.01)
*H04B 7/06* (2006.01)
*H04W 16/28* (2009.01)
*H04W 84/18* (2009.01)

(52) U.S. Cl.
CPC ....... *H04W 72/1231* (2013.01); *H04B 7/0617* (2013.01); *H04W 16/28* (2013.01); *H04W 84/18* (2013.01)

(56) References Cited

U.S. PATENT DOCUMENTS

| | | | | |
|---|---|---|---|---|
| 7,433,332 B2 * | 10/2008 | Golden | ................ | H04B 7/0408 370/328 |
| 7,574,179 B2 * | 8/2009 | Barak | .................. | H04L 5/0023 340/539.1 |
| 7,818,018 B2 * | 10/2010 | Nanda | ............... | H04W 72/1278 370/329 |
| 8,089,881 B2 * | 1/2012 | Walton | ............. | H04W 72/1231 370/235 |
| 8,588,103 B2 * | 11/2013 | Barum | .................... | H04L 45/00 370/254 |
| 8,781,402 B2 * | 7/2014 | Haustein | ................ | H04B 7/022 455/67.11 |
| 9,105,969 B2 * | 8/2015 | Kesselman | ............. | H01Q 3/26 |
| 2004/0087312 A1 * | 5/2004 | Cao | ........................ | H04L 47/10 455/453 |
| 2008/0070510 A1 * | 3/2008 | Doppler | ............... | H04B 17/345 455/69 |
| 2008/0274745 A1 * | 11/2008 | Barak | ................... | H04W 16/02 455/447 |
| 2010/0291876 A1 * | 11/2010 | Hariharan | ........... | H04W 72/082 455/63.1 |
| 2011/0312357 A1 * | 12/2011 | Haustein | ................ | H04B 7/022 455/502 |
| 2012/0275394 A1 * | 11/2012 | Gunnarsson | ........ | H04W 72/082 370/329 |
| 2014/0293948 A1 * | 10/2014 | Jiang | .................... | H04J 11/0056 370/329 |

OTHER PUBLICATIONS

Yu et al., "A Survey of Clustering Schemes for Mobile Ad Hoc Networks," IEEE Communications Surveys, vol. 7, No. 1, pp. 32-48 (Jan. 2005).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).

* cited by examiner

INTERFERENCE MEASUREMENTS AND MANAGEMENT IN DIRECTIONAL MESH NETWORKS

CROSS REFERENCE TO RELATED APPLICATIONS

This application claims the benefit of U.S. Provisional Application No. 61/761,978, filed Feb. 7, 2013, and U.S. Provisional Application No. 61/874,739, filed Sep. 6, 2013, the contents of which are hereby incorporated by reference herein.

BACKGROUND

Millimeter wave (mmW) frequencies may provide a large amount of usable spectrum for communication systems and devices. For example, the 60 Gigahertz (GHz) unlicensed spectrum may provide at least 7 GHz of unlicensed spectrum and additional spectrum may become available for licensed, lightly licensed, and/or unlicensed spectrum. To close the link budget for mmW frequencies, highly directional antennas may be used and are becoming practical and common, for example in wireless high definition (HD) devices. Additionally, there is a potential for greater spatial reuse at higher frequencies including mmW frequencies than at lower (e.g. sub-6 GHz) frequencies.

The higher gain antennas that may be used for mmW communications have an associated benefit of greater directionality that may reduce the interference seen by unintended receivers. At mmW frequencies, large carrier bandwidths may be achievable with comparatively low fractional bandwidths. This may enable single radio solutions that are capable of addressing a large amount of spectrum. Utilizing mmW frequencies may also lead to lower power consumption because of highly directional antennas and the tradeoff of bandwidth and power according to Shannon's law. The mmW frequency carriers have near optical properties and may suffer from high penetration losses, high reflection losses, and little diffraction, leading to line-of-sight dominated coverage. The mmW frequencies may also be subject to propagation challenges, including high oxygen absorption concerns in the 60 GHz band.

SUMMARY

Techniques may be used for interference measurement and management in directional mesh networks, including centralized and/or distributed approaches. A centralized node, such as an operations and maintenance (OAM) center, may use feedback from nodes in the mesh network to partition the nodes in the mesh network into clusters based on interference levels. Interference measurement reports may be used by the centralized node to update cluster membership. An initiating node in the mesh network may use topographical information to generate an initial interference cluster, and interference measurement frame (IMF) scheduling information may be used to schedule transmissions within the interference clusters. Techniques for opportunistic measurement campaigns, simultaneous measurement campaigns, link failure detection, and link re-acquisition in directional mesh networks may also be used.

BRIEF DESCRIPTION OF THE DRAWINGS

A more detailed understanding may be had from the following description, given by way of example in conjunction with the accompanying drawings, wherein.

DETAILED DESCRIPTION

Figure 1A:
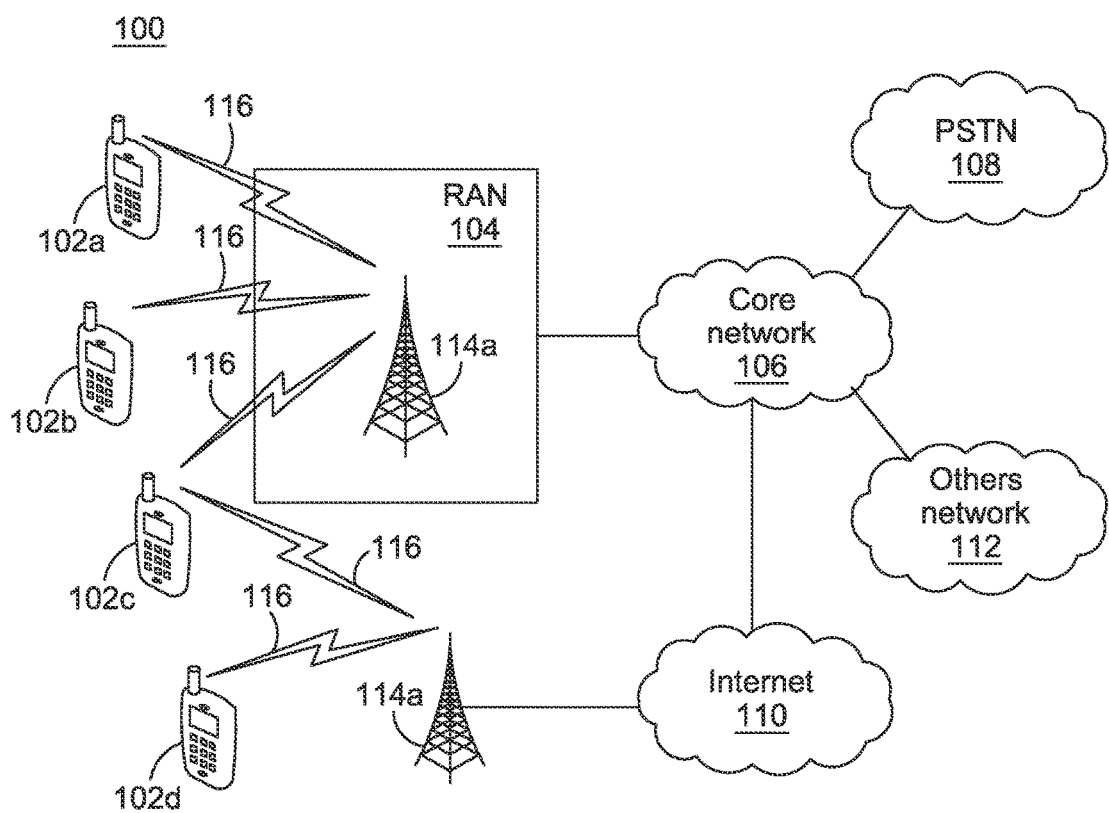
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
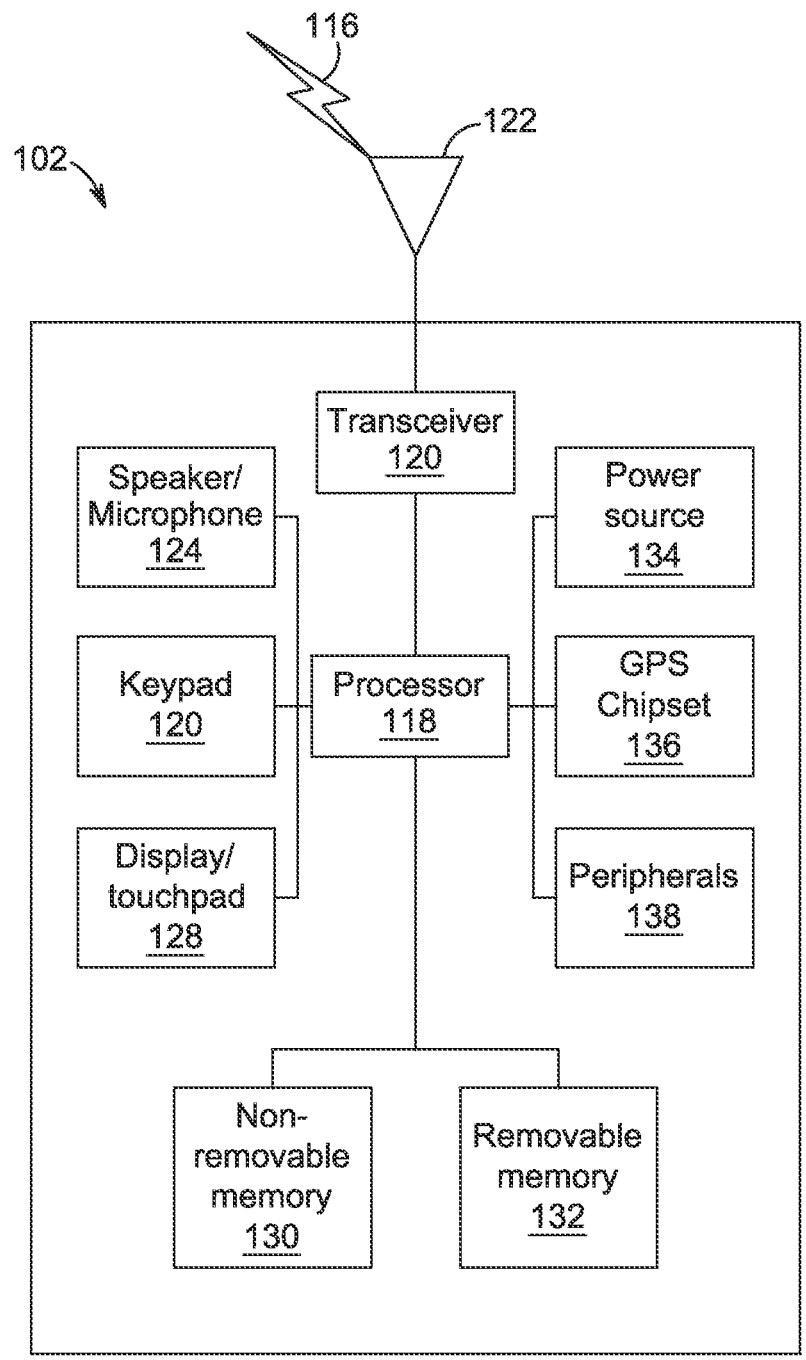
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
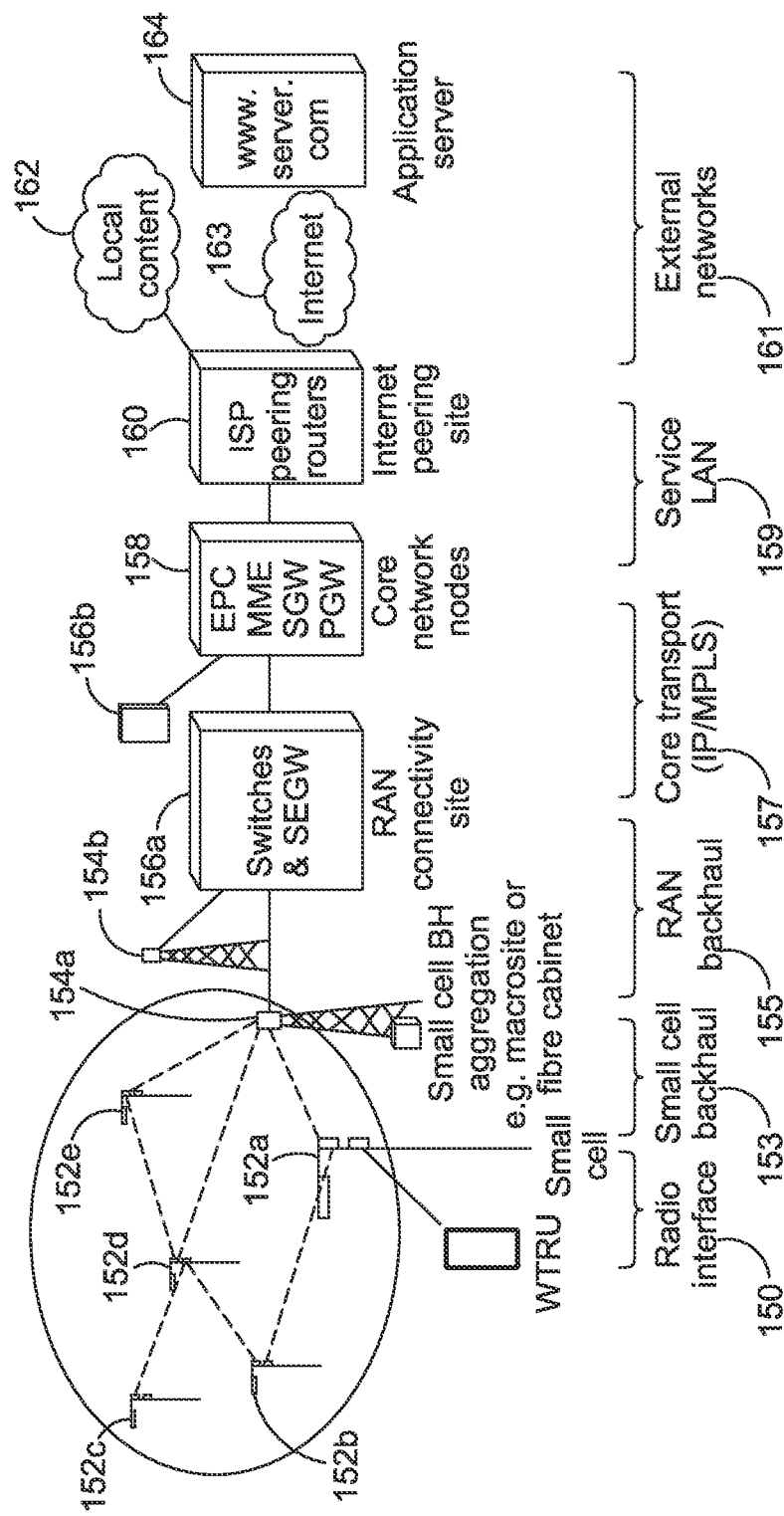
FIG. 1C is a system diagram of a small cell backhaul in an end-to-end mobile network infrastructure, according to an embodiment.

FIG. 1C is a system diagram of a small cell backhaul in an end-to-end mobile network infrastructure, according to an embodiment. A set of small cell (SC) nodes 152a, 152b, 152c, 152d, and 152e and aggregation points 154a and 154b interconnected via directional millimeter wave (mmW)

wireless links may comprise a "directional-mesh" network and provide backhaul connectivity. For example, the WTRU 102 may connect via the radio interface 150 to the small cell backhaul 153 via small cell 152a and aggregation point 154a. In this example, the aggregation point 154a provides the WTRU 102 access via the RAN backhaul 155 to a RAN connectivity site 156a. The WTRU 102 therefore then has access to the core network nodes 158 via the core transport 157 and to internet service provider (ISP) 160 via the service LAN 159. The WTRU also has access to external networks 161 including but not limited to local content 162, the Internet 163, and application server 164. It should be noted that for purposes of example, the number of SC nodes 152 is five; however, any number of nodes 152 may be included in the set of SC nodes.

A mmW directional mesh network may be an attractive economical solution to provide backhaul connectivity to other networks including inexpensively deployed small cells, for example. Directional links utilizing highly directional antennas may be used to close the link budget at mmW frequencies. The backhaul solution may consist of set of small cell nodes and aggregation points interconnected via directional mmW wireless links, resulting in a directional mesh network.

Figure 1D:
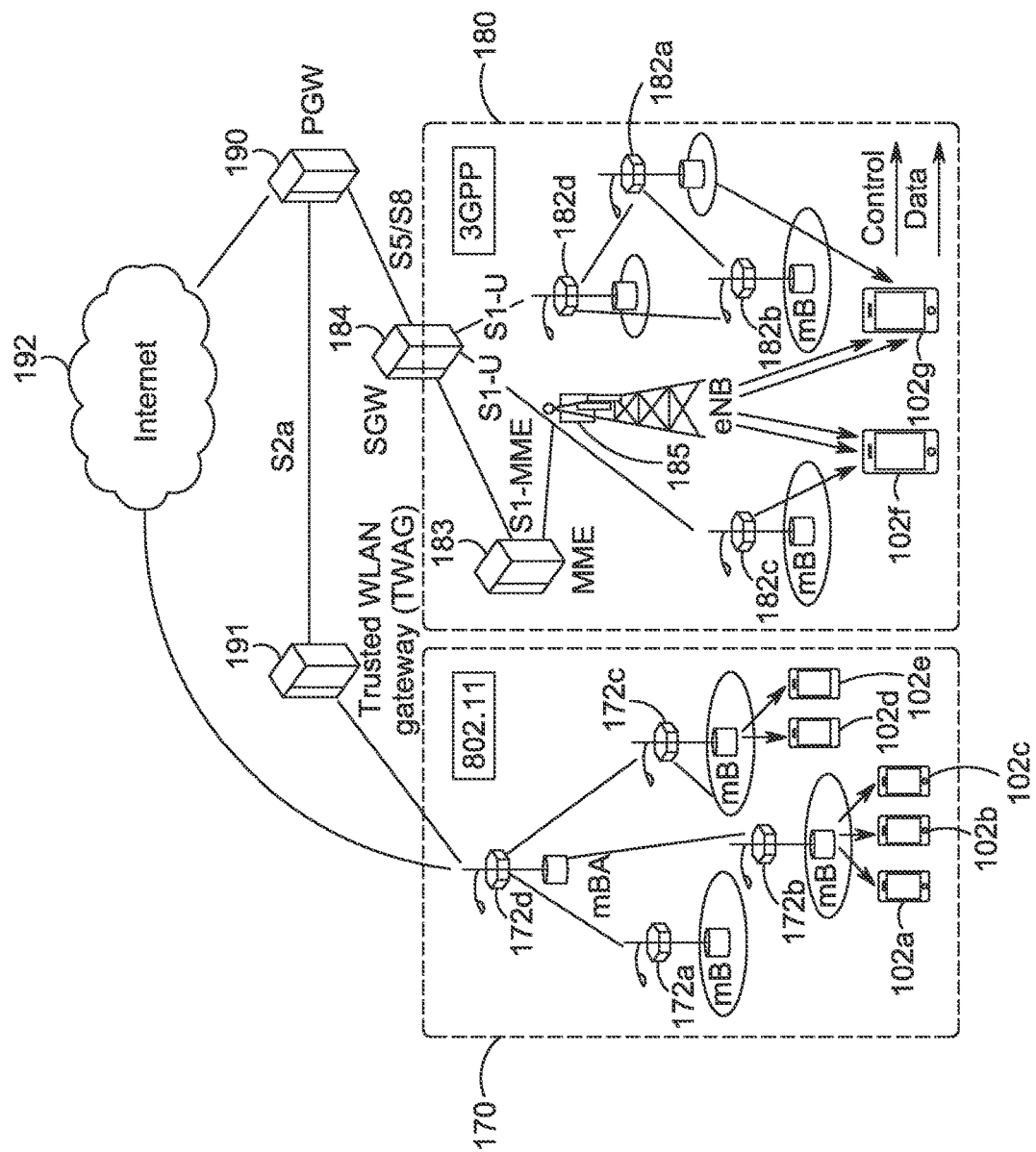
FIG. 1D is a system diagram of a millimeter wave (mmW) backhaul applied to both a Third Generation Partnership Project (3GPP) cellular network and a non-3GPP network access infrastructure, according to an embodiment.

FIG. 1D is a system diagram of a mmW backhaul applied to both a 3GPP cellular network and a non-3GPP network access infrastructure, according to an embodiment. In this example, the non-3GPP network is IEEE 802.11 based. The WTRUs 102a, 102b, 102c, 102d, and 102e may have access via millimeter wave base stations (mBs) 172a, 172b, and 172c in an 802.11 network 170 to a millimeter wave base station aggregator (mBA) 172d. The mBA 172d may provide access to external networks such as the Internet 192, and to the cellular network via a trusted WLAN gateway (TWAG) 191.

Also, in this example, WTRU 102f in the 3GPP network 180 may have access via mBs 182a and 182c to a mobility management entity (MME) 183 and a serving gateway (SGW) 184, which may provide access to public data network gateway (PGW) 190 and the Internet 192.

WTRUs 102f and 102g may also have access via mBs 182a and 182b via mBA 182d to SGW 184, which may provide access to public data network gateway (PGW) 190 and the Internet 192.

WTRUs 102f and 102g may also have access via an evolved Node B (eNB) 185 to the MME 183 and SGW 184, which may provide access to the public data network gateway (PGW) 190 and the Internet 192.

As shown in the examples of FIG. 1C and FIG. 1D, wireless mesh networks (WMNs) operating at mmW frequencies may be used, for example, to serve as backhaul networks for cellular or WLAN SCs such as those based on, for example, LTE or IEEE 802.11. An mmW directional mesh network may be an economical solution to provide backhaul connectivity to several cheaply deployed SCs. Directional links using highly directional antennas may be used to close the link budget at mmW frequencies. A directional mesh network may also provide a flexible topology by requiring Line-Of-Sight (LOS) with only immediate neighbors. A directional mesh network may provide easy scalability in that new nodes may be added with minimal network planning. A directional mesh network may provide robustness in redundancy provided by multiple connectivity paths between mesh-nodes. A directional-mesh network may be configured with fully distributed scheduled, multi-hop, and time division multiple access (TDMA) based directional mesh MAC features to ensure fast scheduling and short queue times.

Directional mesh networks may provide a flexible topology because LoS requirements may only be needed with immediate neighbors as opposed to an aggregation point. Directional mesh networks are scalable, such that new nodes may be added with minimal network planning. Directional mesh networks may be robust to link failures due to the redundancy provided by multiple connectivity paths between mesh nodes. A distributed directional mesh medium access control (MAC) may include fully distributed, scheduled, multi-hop, and time division multiplexing (TDM) based directional mesh MAC features for fast scheduling and short queue times.

Procedures for distributed interference measurement and management for mesh networks with directional transmission and reception are disclosed herein. Distributed interference measurement procedures may take advantage of the spatial dimension to partition the network into non-overlapping clusters in a first stage, and then employ refined interference measurements within each cluster simultaneously. Centralized and periodic interference measurements procedures may employ a centralized node to partition the network into clusters based on feedback from the nodes and to identify the measurement campaign per cluster iteratively, by updating cluster sizes and the corresponding measurement schedule based on the measurement results.

According to an embodiment, a distributed interference measurement procedure may include a two-stage campaign composed of long-term and short-term measurement. Similarly, a centralized interference measurement procedure may include a two-stage campaign with long-term and short-term measurement. A cluster interference measurement parallelization procedure may be based on the scheduling of bitmap information obtained from the nodes and interference matrix. Distributed interference measurement procedures may be based on the scheduling bitmap obtained from the neighboring nodes as well as the interference matrix.

According to mechanisms for an opportunistic measurement campaign, nodes may utilize the idle modes in detecting the interference power by identifying the interfering node through the received power profile. According to simultaneous measurement campaign procedures, the measuring node may detect the signal power level of potential interferers using orthogonal codes.

According to a proactive procedure, nodes may be enabled to identify the link degradation quality in advance of link failure through the control frame feedback during the scheduling intervals. The nodes may classify the degradation cause, and may take steps to combat the interference by using beam-tracking procedures and/or by alternative beams (for example, non-LoS (NLoS) beams with larger spatial separation than the beams in use) in cooperation with peer mesh nodes. According to link failure detection and link re-acquisition procedures, link re-establishment mechanisms may be triggered utilizing beam and link configuration information gathered from the previous link establishment parameters.

According to an embodiment, interference measurement in the network may be carried out by a pre-determined frame that may schedule the nodes for the measurement campaign. The frame may be denoted as an interference measurement frame (IMF) and may be scheduled according to example schedules described below.

Figure 2:
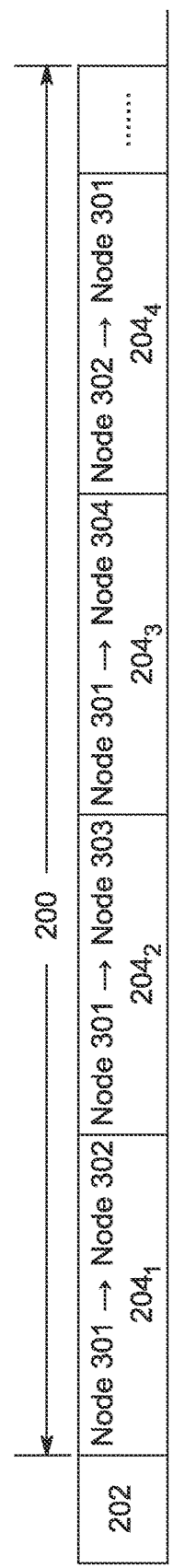
FIG. 2 is a block diagram of an example interference measurement frame (IMF) format with a time slotted structure.

The IMF may have a pre-determined schedule to carry out the measurement campaign. The pre-determined schedule may be initiated by a particular node, cluster head, or aggregation point, for example. According to an example, the measurement scheduling may be controlled by the node that initiates the interference measurement campaign. FIG. 2 is a block diagram of an example IMF 200 format with a time slotted structure. The IMF 200 may be preceded by a timing reference signal 202. At each time slot $204_1 \ldots 204_4$ in IMF 200, a particular node pair may be scheduled for measurement, for example: timeslot $204_1$: Node301→Node302; timeslot $204_2$: Node301→Node302; timeslot $204_3$: Node301→Node304; and timeslot $204_4$: Node302→Node301 (described further in FIG. 3). By exploiting the size of the mesh network, multiple measurements may be performed simultaneously for the node pairs that are physically far apart, hence decreasing the number of slots in IMF through multiplexing.

Figure 3:
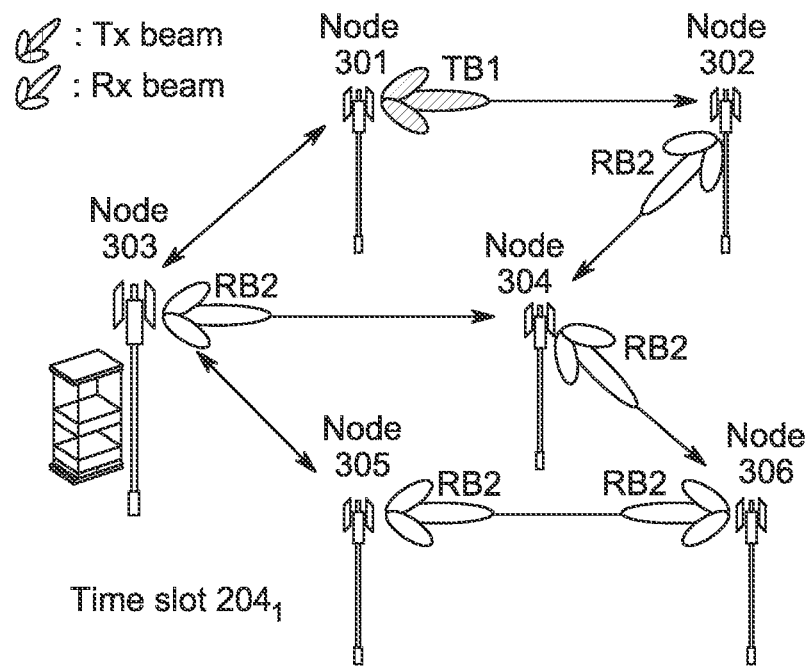
FIG. 3 is a system diagram of an example group of mesh nodes and their respective candidate beams during the transmission of the IMF in FIG. 2.
Figure 3:
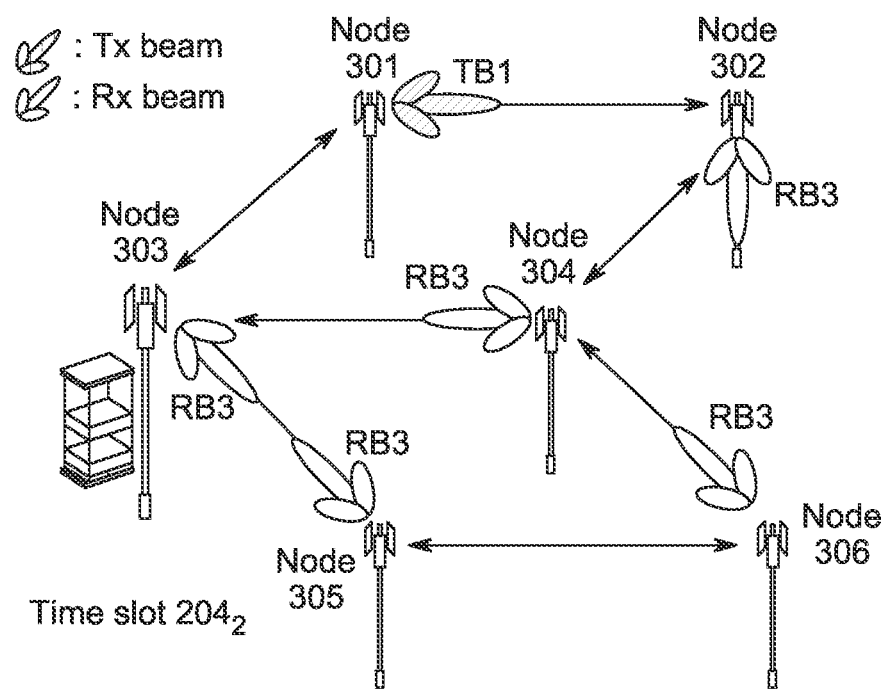

In the mesh network, the nodes may establish links with their neighbors and may develop refined beams for high rate communication prior to the transmission of the IMF. FIG. 3 is a system diagram of an example group 300 of mesh nodes 301-306 and their respective candidate beams during the transmission of the IMF 200 in FIG. 2. In the example of FIG. 3, transmit-receive beams are shown between the nodes, which can be determined during transmit and receive beam refinement stages. For example, some of the transmit beams (TBs) and receive beams (RBs) shown in FIG. 3 include:

Node 301→Node 302={TB1, RB1}, Node 301→Node 303={TB2, RB1}, Node 301→Node 304={TB3, RB1}, ...,
Node 302→Node 301={TB1, RB1}, Node 302→Node 303={TB2, RB2}, Node 302→Node 304={TB3, RB2}, ...,
Node 303→Node 301={TB1, RB2}, Node 303→Node 302={TB2, RB2}, Node 3→Node 4={TB3, RB3}, ..., and so on.

With reference to both FIGS. 2 and 3, in timeslot $204_1$, node 301 may transmit to node 302 using refined beam TB1 associated with node 302. For example, the refined beam TB1 may have been developed during a beam-refinement procedure and selected as the transmit beam to be used during communication with node 302. The neighboring nodes 303, 304, 305 and 306, may measure interference by sequentially listening with refined beams RB2 in the time slot $204_1$, for example, in timeslot $204_1$ and on refined beam RB3 in the following time slot $204_2$. The receive beams may already be associated with other nodes for the interference measurement campaign. Due to the full-duplex operation, Node 301 may also measure the interference at its receive beams RB2, RB3. Because RB1 is already associated with node 302 reception, there is no need for interference measurement for that beam. Generally, in a slot i, a similar procedure to slot $204_1$ may be employed between the nodes, while node k may transmit with its associated beam with node j, for k, j=1, ..., N.

Figure 4:
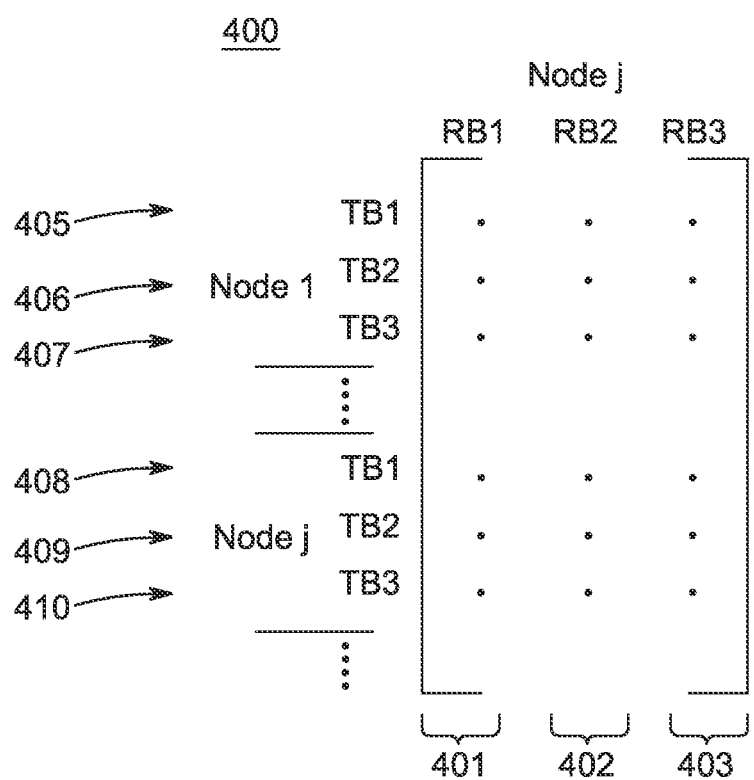
FIG. 4 is a diagram of an example interference measurement (IM), where the columns denote the interference measured and the rows denote from which neighbor the interference is measured.

At the end of IMF 200, each node j may have an interference matrix (IM). FIG. 4 is a diagram of an example interference measurement (IM) 400, where the columns 401, 402 and 403 denote the interference measured at node j's receive beams RB1, RB2, and RB3, and the rows denote from which neighbor the interference is measured. For example, row 401 for node 1 on transmit beam TB1, has a particular destination corresponding to this transmit beam, for example Node 2. Hence, using an IM 400, Node j may be able to identify how much interference it receives during the Node1→Node2 transmission.

According to an embodiment, a distributed interference measurement procedure may comprise a two-level measurement campaign: a long-term measurement campaign (IMF stage) and a short-term measurement campaign (cluster IMF stage). A large number of nodes may participate in the long-term measurement campaign, which may be carried out by an IMF. Based on the interference measurement results obtained by the long-term measurement campaign, each node may create a cluster to perform a more detailed interference measurement procedure as part of a short-term measurement campaign, which may be carried out by a cluster IMF (C-IMF). These procedures are described in more detail below.

Figure 5:
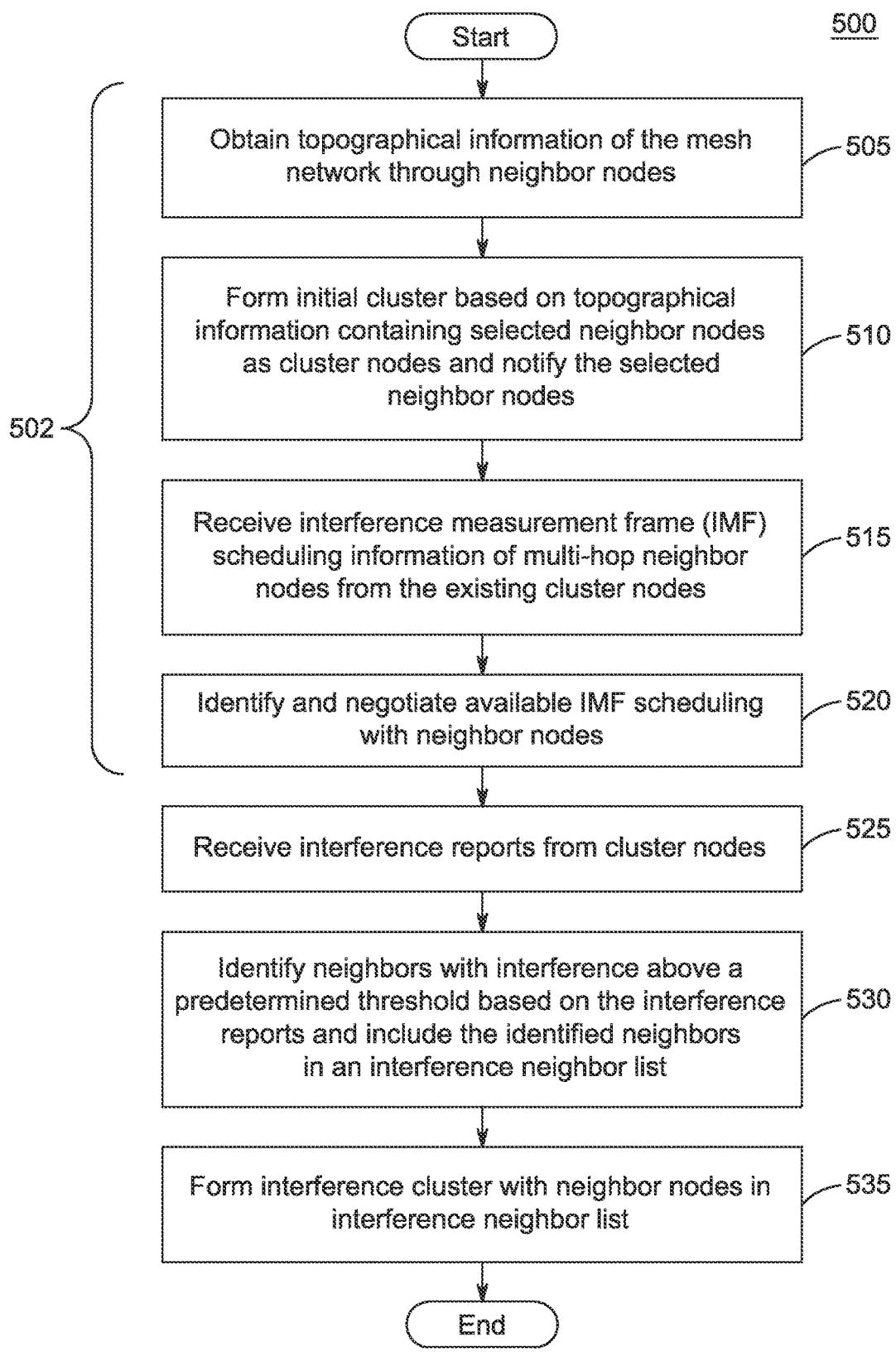
FIG. 5 is a flow diagram of an example procedure for determining the initial interference cluster to perform interference measurements.

A long-term measurement campaign may start with a large IMF region, obtained when a node joins the network. FIG. 5 is a flow diagram of an example procedure 500 for determining the initial interference cluster to perform interference measurements. The procedure 500 may be performed by an initiating node, and may include a long-term measurement campaign procedure 502. The initiating node, upon joining a mesh network, may obtain topographical information of the mesh network through neighbor nodes during an association process, 505. The initiating node may form an initial cluster based on the topographical information containing selected neighbor nodes within a predefined number of hops and may notify the selected neighbor nodes of the initial cluster formation, 510, for example through control messaging.

The initiating node may receive the IMF scheduling information for multi-hop neighbor nodes from the existing nodes in the cluster, 515, for example via control messaging received from the multi-hop neighbor nodes. In other words, the selected neighbor nodes that form the cluster may collect and inform the IMF scheduling information of their respective neighbor nodes (which may be different from the neighbor nodes of the initiating node) in order to obtain IMF scheduling of the multi-hop neighbors to the initiating node. The initiating node may identify available IMF scheduling and may negotiate this with its neighbor nodes within the cluster, 520, which may include single hop and/or multihop neighbors. For example, the IMF may be scheduled in longer intervals during device discovery timeslots.

With the completion of the long-term measurement campaign procedure, 502, the initiating node (and each participating node, respectively) may receive an interference report from its cluster nodes (i.e. the neighbor nodes that are in its cluster), 525. The initiating node may identify the neighbors that create interference above a predetermined threshold based on the interference reports, and may include these nodes on an interference neighbor list, 530. The nodes on the interference neighbor list may be the set of nodes that form the refined interference cluster with the initiating node, 535.

Accordingly, by using procedure 500 in FIG. 5, each node in the mesh network may obtain a refined interference neighbor list and form its respective refined interference measurement cluster. The mesh nodes may employ cluster IMF (C-IMF) to perform short-term interference measurements within the cluster.

Figure 6:
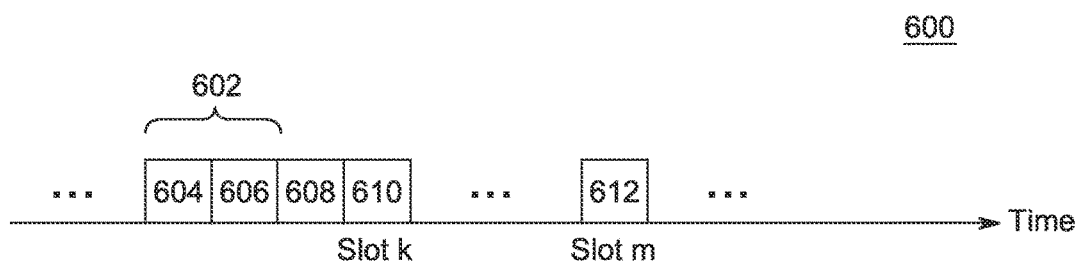
FIG. 6 is a block diagram of an example frame structure with scheduled IMF and cluster-IMF (C-IMF) for an initiator node in a refined measurement cluster using a distributed interference measurement approach.

FIG. 6 is a block diagram of an example frame structure 600 with scheduled IMF 606 and C-IMF 610, 612, for an initiator node in a refined measurement cluster using a distributed interference measurement approach. A device discovery interval 602 may include beacon transmission 604 and IMF 606. Periods of data 608 transmission and/or receptions may occur following IMF 606. The node may be assigned C-IMF 610 and 612 in slots k and m, respectively.

According to a C-IMF scheduling procedure within a refined cluster, the nodes in the refined cluster may be informed regarding the identifications (IDs) of the other nodes in the cluster. The cluster initiator node may obtain the C-IMF scheduling of the existing nodes in the network via the control messages transmitted by these nodes. After obtaining the C-IMF scheduling of the existing nodes, the initiator node of the cluster may broadcast its C-IMF scheduling slots (for example, in slots k and m in FIG. 6) to its one-hop neighbors via control information. The one-hop neighbors may relay this information to their one-hop neighbors, which are members of this cluster.

After the C-IMF phase is completed, the nodes in the cluster may transmit the measurement reports to the initiator node. For those nodes that are more than one hop away from the initiator node, the measurement report may be transmitted in multi-hop fashion. With the measurement reports, the initiator node may identify the nodes in the cluster to which the created interference is below the threshold. The initiator node may report back the ID of these identified nodes and they may be removed from the interference measurement list.

According to an example, each node in the cluster may identify whether the received interference from the initiator node is below the predefined threshold or not, and may inform the initiator node that it may be removed from the cluster if the received interference is below the predefined threshold. C-IMF and the scheduling of C-IMF may be further updated by taking into consideration the remaining nodes in the network.

In a cluster, cluster parallelization may occur where the nodes in the cluster may inform the cluster initiator node regarding their interference report and also their request to be removed from the cluster due to low interference. For example, the nodes may transmit this information to the nodes beyond the C-IMF cluster. By way of example, assume that Node1 has created its C-IMF cluster and has informed the nodes in the C-IMF cluster regarding the C-IMF scheduling, where the cluster is composed of Node1, Node2, Node3, Node4, Node5, and Node6.

During the interference campaign during C-IMF, Node2 and Node3 may identify that the received interference from Node1 is below the threshold. Via control messaging, Node2 and Node3 may inform Node1 of their request for removal from the cluster. Node2 and Node3 may also inform the nodes beyond Node1's cluster regarding their removal from Node1's cluster, as well as their measurement scheduling information (described in FIG. 7 below).

A node outside of the Node1's cluster, for example, Node9, may collect the available scheduling bitmaps from the Node2 and Node3. Node9 may identify the nodes which are also in its IMF region and may group the nodes which have the same slots emptied due to removal from Node1's measurement cluster. Node9 may form a new cluster for each such group and may inform these nodes regarding their new cluster. Node9 may initiate a C-IMF campaign that may be operated in parallel to Node 1's C-IMF campaign.

Figure 7:
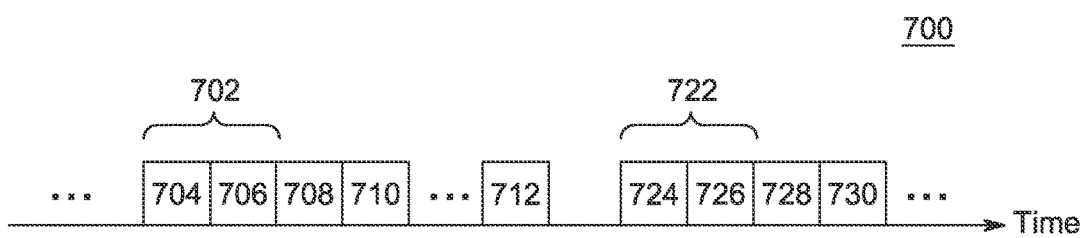
FIG. 7 is a block diagram of an example frame structure with scheduled IMF and C-IMF for an initiator node in a refined measurement cluster using a centralized interference measurement approach.

According to another embodiment, a centralized interference measurement procedure may consist of two cycles: a long-term interference measurement procedure for widespread measurements and short-term interference measurement procedure for optimized measurements. FIG. 7 is a block diagram of an example frame structure 700 with scheduled IMF 706, 726 and C-IMF 710, 712, 730 for an initiator node in a refined measurement cluster using a centralized interference measurement approach.

The long-term measurement procedure using IMF 706, 726 may determine the interference measurement clusters in the network. According to an example, the node locations (e.g. network geography) may be available to the OAM center. Depending on physical parameters including, but not limited to distance, and hop-count, the OAM center may split the overall network into several interference zones or clusters where IMF may be employed.

The short-term measurements using C-IMF 710, 712, 739 may include creating an optimized schedule and parallelization. For example, interference measurement may be performed at each cluster. With shorter intervals, local nodes may participate in the measurement, and the OAM may inform the clusters regarding their C-IMF scheduling.

Figure 8:
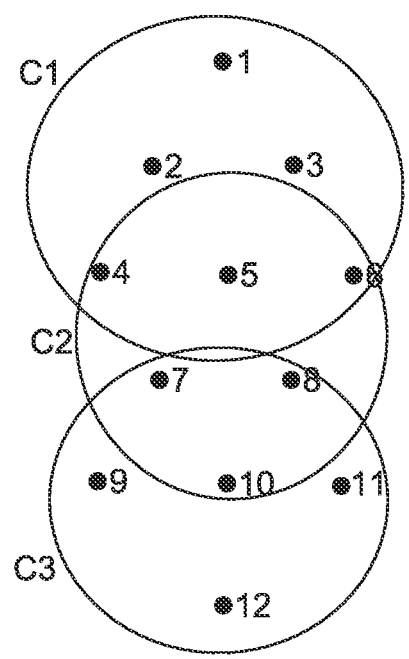
FIG. 8 shows an example network with clustering of nodes by a centralized node based on topology.

A centralized interference measurement procedure may include cluster formation. For example, each OAM center may cover an area A including N nodes and may be responsible for cluster formation within its coverage A. Using the topology information, the OAM center may divide the network of nodes into clusters based on the distance between the nodes. FIG. 8 shows an example network 800 with clustering of nodes by a centralized node based on topology. The centralized node, for example, may use geographical information to create non-overlapping clusters of nodes (numbered 1-12) such as clusters C1 and C3 in FIG. 8. The cluster sizes may be updated depending on the measurement reports of the nodes and in case of a new node joining the network. C2 is an example of an edge cluster that includes nodes from non-overlapping clusters C1 and C3.

Figure 9:
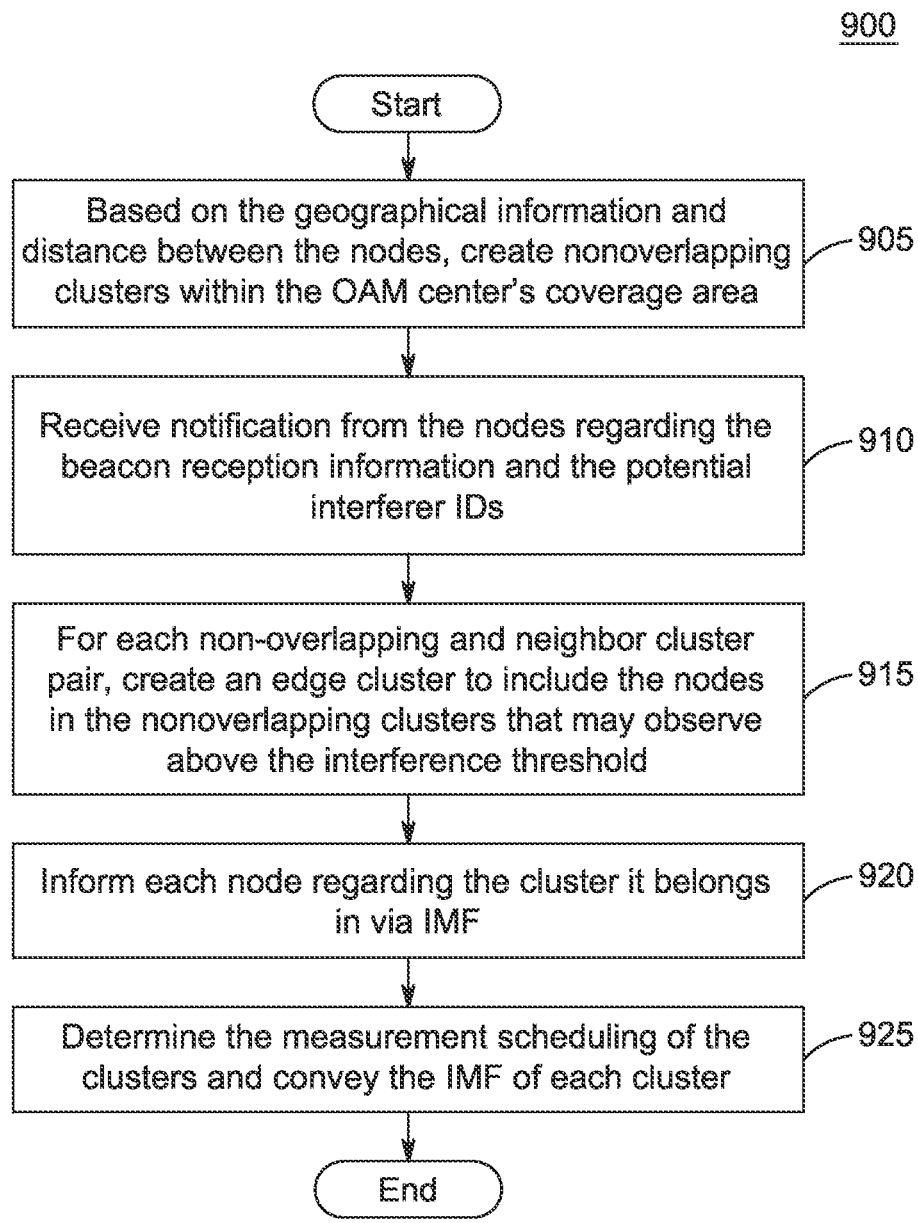
FIG. 9 is a flow diagram of an example cluster formation procedure at an operations and maintenance (OAM) center.

FIG. 9 is a flow diagram of an example cluster formation procedure 900 at an OAM center. Based on the geographical information and distance between the nodes, non-overlapping clusters may be created within the OAM center's coverage area, 905. The clusters may be labeled accordingly (e.g. C1 and C3 in FIG. 8.) The initial clusters may contain a large number of nodes to include potential interferers within a threshold value IntTH. For example, all nodes that could decode each other's beacon transmission may be included in the same cluster. The OAM center may receive notification from the nodes regarding the beacon reception information and the potential interferer IDs, 910.

For each non-overlapping and neighbor cluster pair, an edge cluster may be created to include the nodes in the non-overlapping clusters that may observe above the interference threshold, 915 (eg. threshold IntTH.) The clusters may be labeled accordingly (e.g. C2 in FIG. 8.) The OAM center may inform each node regarding the cluster it belongs in via IMF, 920 (e.g. as shown in FIG. 2.) The OAM center may determine the measurement scheduling of the clusters and convey the IMF of each cluster, 925. As a result, each node in the cluster may receive IMF corresponding to the cluster it is associated with, the edge cluster that its associating cluster intersects with, and the non-overlapping neighbor cluster.

The measurement may be carried out initially at the edge clusters, while the neighboring clusters may be kept silent. The measurement campaign may be done in parallel for the non-overlapping clusters. With the measurement scheduling information available, the nodes that are at the edge of each non-overlapping cluster may identify the inter-cluster interference due to the corresponding nodes in the neighbor cluster, and subtract the corresponding interference power from their own cluster measurement results.

According to a cluster update request procedure, a node may inform the OAM center regarding the cluster update request which may be triggered when a new neighbor node joins the network and associates with the node, or after the measurement campaign, where the node identifies neighbor nodes in the cluster that create interference below the accepted interference threshold level, IntTH. The Node IDs may be conveyed to the OAM center and the OAM center may update the cluster size by removing these nodes from the existing cluster. Based on the results, the OAM center may split the initial cluster into multiple smaller clusters.

According to an embodiment, the nodes in the cluster may participate in a periodic interference measurement campaign to refresh the interference profile of the cluster. The periodic measurement may be performed during a beacon response interval (BRI) period of beacon transmission. The periodicity of the measurements may be determined by the operator via the OAM center and/or may be implementation-specific. For example, a default periodicity value of every K beacon intervals may be assumed for illustrative purposes.

Figure 10:
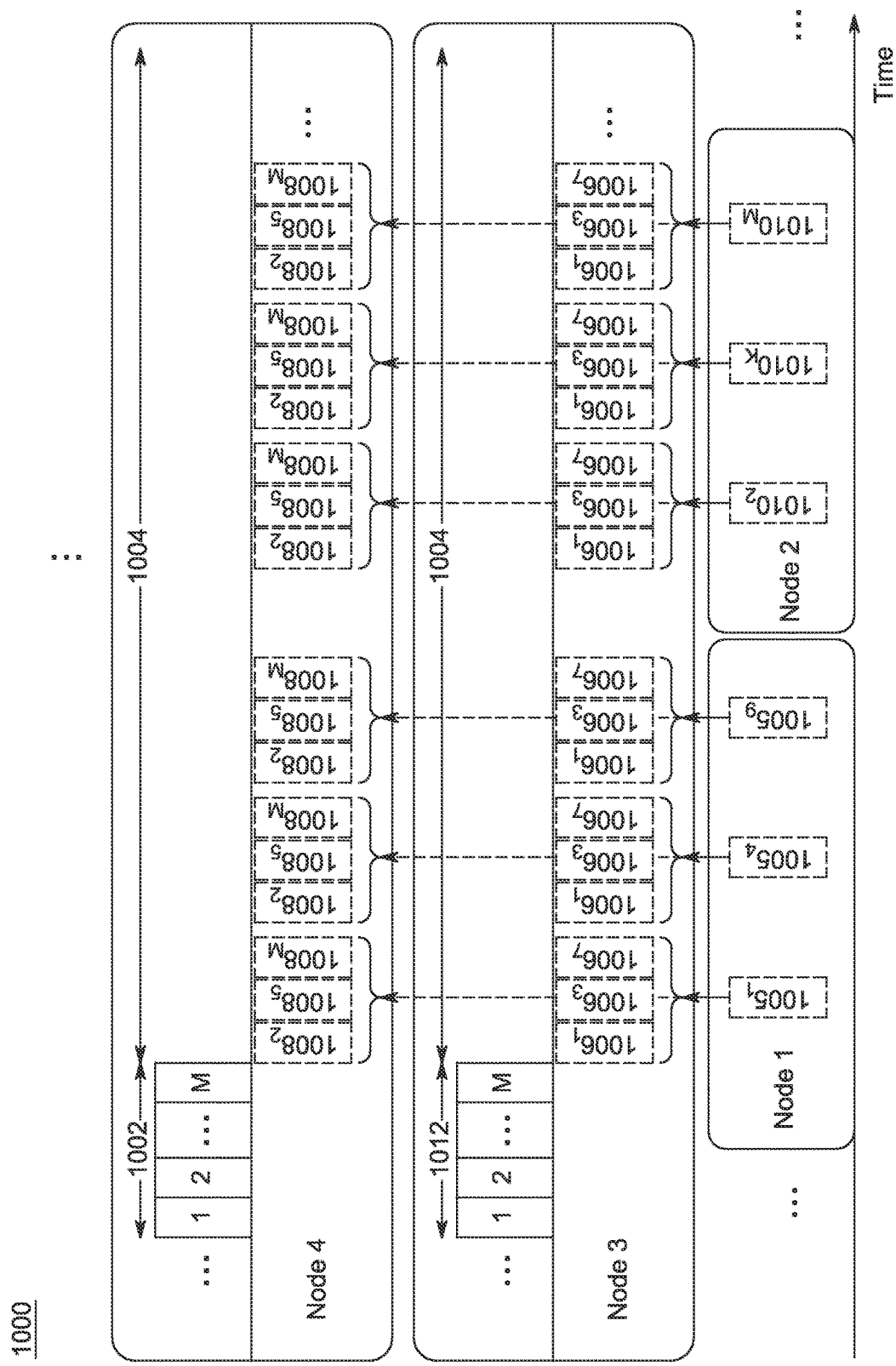
FIG. 10 is a signal diagram of an example interference measurement procedure in a cluster during a beacon response interval (BRI)

With a given BRI period, the interference measurement per cluster may be carried out in multiple consecutive beacon intervals. FIG. 10 is a signal diagram of an example interference measurement procedure 1000 in a cluster during a BRI 1004. In the example of FIG. 10, it may be assumed that Node 1 may transmit sequentially using its transmit beams associated with its neighbors. For example, Node 1 may transmit beams $1005_1$, $1005_4$, $1005_9$, and Node 3 and Node 4 may receive the transmit beams $1005_1$, $1005_4$, $1005_9$ using their receive beams associated with their neighbors, for example receive beams $1006_1$, $1006_3$, and $1006_7$ for Node 3 and $1008_2$, $1008_5$, and $1008_M$, for Node 4.

Other nodes in the network not shown, for example Nodes 2, 3, 4, 5, and 6, may measure signals from Node 1 simultaneously including transmit beams $1005_1$, $1005_4$, $1005_9$. After Node 1 completes its transmission of transmit beams $1005_1$, $1005_4$, $1005_9$, the interference measurement campaign may be continued by a next node denoted in the IMF frame. In the example shown in FIG. 10, Node 2 may transmit beam set $1010_2$, $1010_K$, and $1010_M$ such that the other nodes including Node 3 and Node 4 may measure Node 2's signals $1010_2$, $1010_K$, and $1010_M$. The remaining duration in the IMF may be carried out during a subsequent beacon interval. 1002 and 1012 show the beacon transmission interval at Node 4 and Node 3, respectively. During the interval, Nodes 3 and 4 may transmit M different beacons 1002 and 1012, respectively, in a sequential manner with each beacon corresponding to one of the M slots.

According to an embodiment, measurements may be event triggered. The periodic measurement campaign may provide an interference profile to the nodes in every beacon interval. In case of topology changes, for example as a result of a new node powering up and associating with an existing node in the network, the measurement campaign may take into account the interference created by this new node to the existing nodes as well as from the existing nodes to the new node. The beam selection procedure of the new node with the node it associates with may take into account the resultant interference, in which case a signal-to-interference and noise ratio (SINR) based beam selection procedure may be used, which may include updates in the cluster size and the measurement campaign as well as the corresponding IMF formation.

A request by the new node to associate with a mesh node may be informed to the OAM center by the mesh node itself. After receiving the request, the OAM center may update the cluster to which the new node is assigned. The cluster update may also facilitate an updated IMF message transmission from the OAM center to the members of the cluster. According to an example, the transmit and/or receive beam training between the new node and a mesh node may be carried out simultaneously with the interference measurement campaign of the cluster to which the new node is added.

Figure 11:
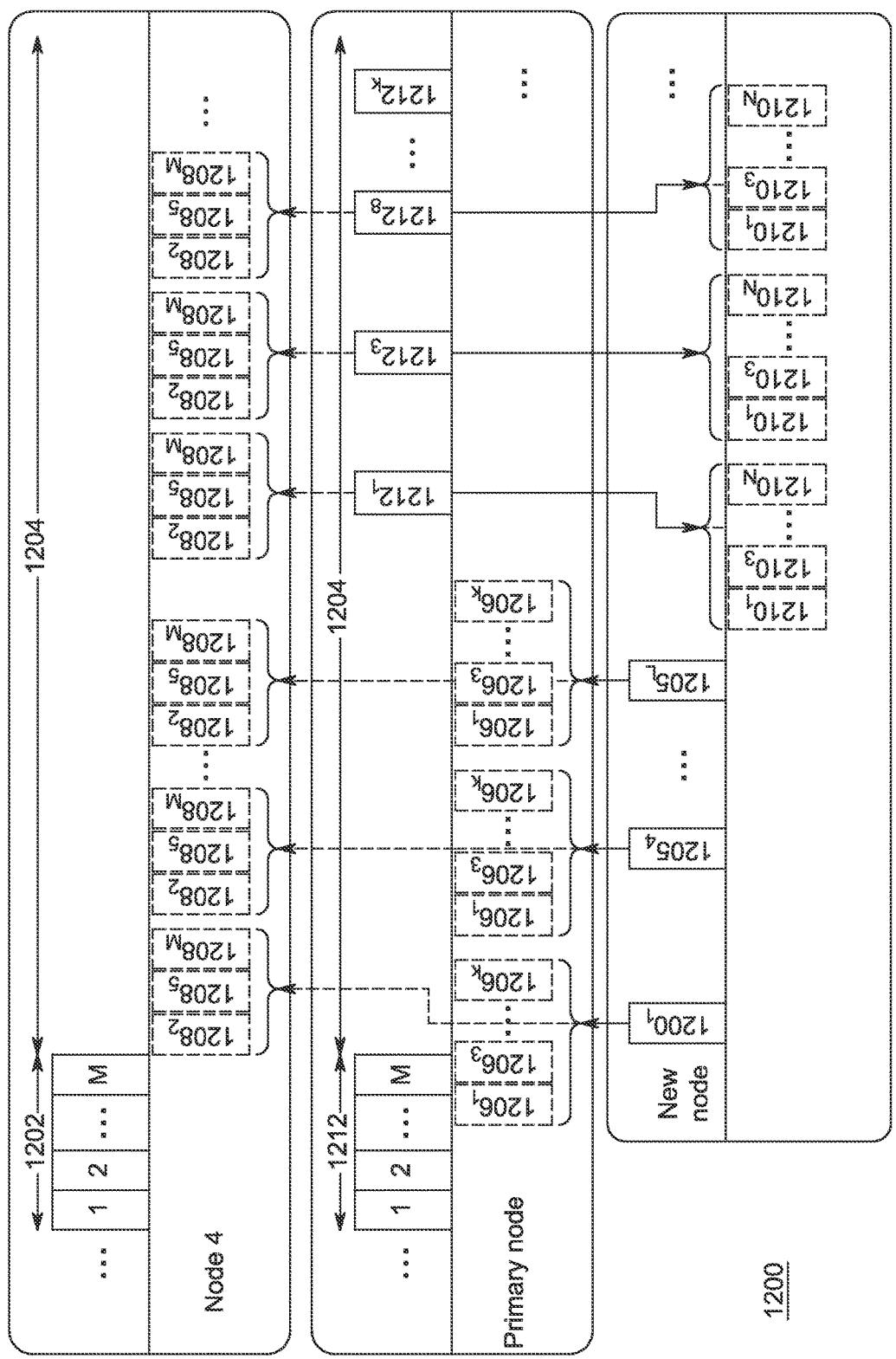
FIG. 11 is a signal diagram of an example interference measurement procedure in a cluster during a BRI.

FIG. 11 is a signal diagram of an example interference measurement procedure 1200 in a cluster during a BRI 1204. In the example of FIG. 11, measurement scheduling occurs between a new node to the mesh network, the primary node (to which the new node associates), and the other mesh nodes in the measurement cluster including for example Node 4. The measurement scheduling may occur within a BRI period 1204. The New Node may transmit sequentially using its transmit beams associated with its neighbors. For example, the New Node may transmit beams $1205_1$, $1205_4$, $1205_L$, and the Primary Node and Node 4 may receive the transmit beams $1205_1$, $1205_4$, $1205_L$ using their receive beams associated with their neighbors, for example receive beams $1206_1$, $1206_3$, and $1206_K$ for the Primary Node and $1208_2$, $1208_5$, and $1208_M$, for Node 4. Node 4 and the primary node may have beacon transmission intervals (BTIs) 1202 and 1212, respectively. The new node may have beacon receive intervals (BRIs) $1210_1$-$1210_N$, which may receive transmit beams $1212_1$, $1212_3$, $1212_8$, . . . , $1212_K$ from the primary node. Each transmit beam $1212_1$, $1212_3$, $1212_8$, . . . , $1212_K$ may be associated with a particular neighbor node for communication.

After the new cluster is generated along with its IMF, the OAM center may inform each cluster member node using the IMF of the new cluster. The nodes may identify the beam training procedure scheduling between the mesh nodes and new node and also the simultaneous interference measurement campaign. By utilizing simultaneous and parallel operation of both beam training and measurement, both the beacon transmission interval (BTI) and its scheduling may be carried out during the BTI and BRI of the beacon interval.

According to another embodiment, opportunistic interference measurement may be used. As opposed to the IMF-based interference measurement campaign described above where all the nodes in a cluster participate in the measurement campaign, an opportunistic procedure may opportunistically measure the interference at each node. By way of example, consider a Node 1 that has gone through the beamforming stage with its one-hop neighbors Node 2 and Node 3. The receive beams at Node 1 formed for Node 2 communication and Node 3 communication may be denoted as Beam 1 and Beam 2, respectively.

Node 1, during its idle period (e.g. when no transmit and receive operation occurs), may listen to the channels via its receive beams Beam 1 and Beam 2. Initially, Node 1 may allocate an equal amount of time between its beams Beam 1 and Beam 2 for possible interference measurement, where the measurement time allocated to the beams may be optimized depending on the measurement strength. Node 1 may try to decode the MAC header of the received signal during its interference measurement campaign. If the node successfully decodes the header, it may recognize which nodes communicate during the measurement time, and may be able to determine the interference observed during the corresponding node's communication. This information may be stored at Node 1 in an interference matrix.

In the case where Node 1 is not able to decode the MAC header of the interfering signal, Node 1 may measure the energy of the received signal during a given time frame (e.g. [x,y]) and may store the information. This measurement campaign may be carried out during multiple time frames such that Node 1 may identify the interference signal power profile. To identify the interfering source pair, Node 1 may transmit the interfering signal profile, for example the signal strength and/or the measurement time frames, to the neighbor nodes. If any neighbor node matches its transmit profile to Node 1's interference profile, then this neighbor node may inform Node 1 accordingly via control messaging. Node 1 may be able to determine the source of the measured interference and add the information to its interference matrix. If no single node is able to match its transmit profile to the received interference profile, then the nodes that have been transmitting during the measurement campaign may be added to the potential interfering node list. Then, similar to the distributed IMF campaign described above, Node 1 may initiate IMF scheduling including these nodes to identify the source of the interference.

Depending on the received interference power at the beams, Node 1 may optimize the time allocated at each node for interference measurement. For example, Node 1 may allocate T % of the time resource for Beam 1 and 100-T % of the time resource for Beam 2.

Figure 12:
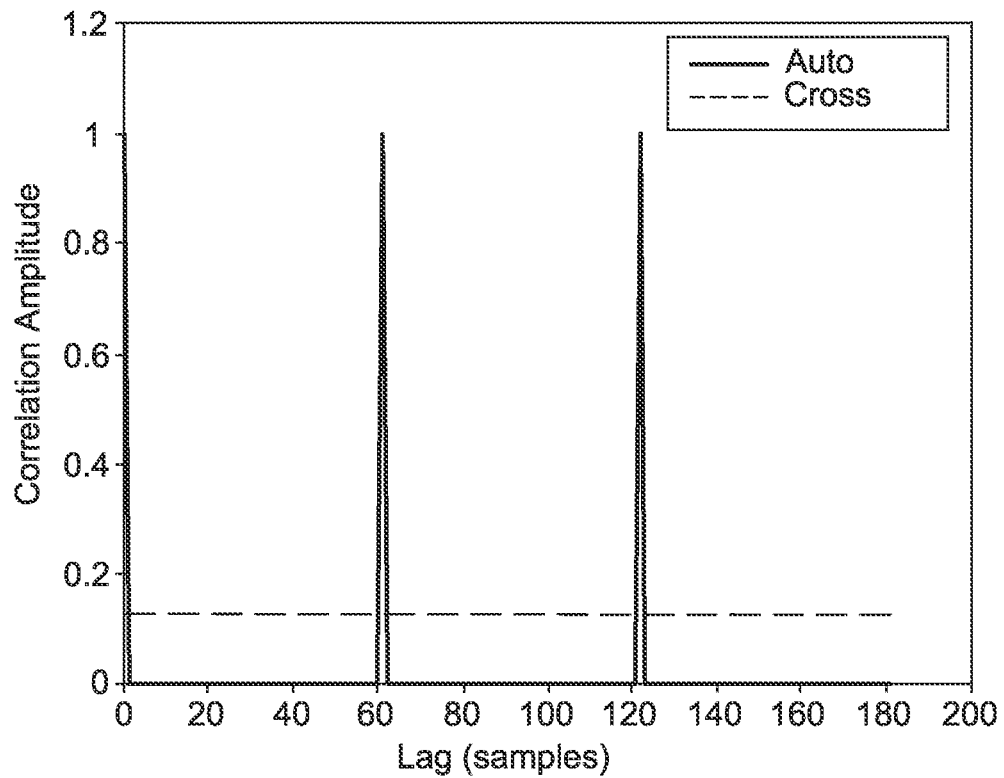
FIG. 12 is a graph showing the auto-correlation and cross-correlation properties in terms of correlation amplitude of a prime-length Zadoff-Chu (ZC) sequence over a lag.

According to another embodiment, simultaneous interference measurement procedures may be used. The transmitters may simultaneously transmit in the same time and frequency block during the measurement period and the receiving node may try to identify the interference due to each interferer at the same time. During this interference measurement period, a node may detect and measure transmissions from multiple transmitting nodes. As the multiple measurement transmissions occur simultaneously over the same frequency allocation, they may differentiate in the code domain by transmitting a sequence that has an ideal or close to an ideal auto-correlation and cross-correlation property. For example, a Zadoff-Chu (ZC) sequence may be used that has an ideal cyclic auto-correlation (i.e. delta function) when the sequence length is a prime number. Furthermore, two ZC sequences have a constant cross-correlation when the difference of the two sequence root indexes is relatively prime to the sequence length. The ideal correlation property may not be retained on any arbitrarily selected sequence length. FIG. 12 is a graph showing the auto-correlation and cross-correlation properties in terms of correlation amplitude of a prime-length ZC sequence over a lag (i.e. number of samples). The cross-correlation is shown by the dashed line and the auto-correlation is shown by the solid line, for values of sequence indices q1=25, q2=29 and sequence length N=61.

The use of a sequence-based interference measurement may take into account any combination of the following considerations. For example, each measurement transmission may be synchronized to maintain the orthogonality in the code domain. The measurement transmission may apply a guard period to overcome any time uncertainty caused by different propagation delays. Each sequence transmission may carry a node-specific signature, which may be embedded in the cyclic shift index of the same ZC root sequence for the measuring node to distinguish between and identify the interference source.

In another example, the number of cyclic shifts that can be generated from one ZC root sequence may depend on the cyclic shift size. The cyclic shift size may be set so that the Zero Correlation Zone (ZCZ) of the sequence may ensure the orthogonality regardless of the delay spread and other types of time uncertainty, including but not limited to temperature controlled oscillator (TCXO) inaccuracy. In another example, the minimum value of the cyclic shift size may be the smallest integer number of sequence sample periods that is greater than the sum of the maximum delay spread, the estimated time uncertainty between nodes, and/ or additional guard samples, which may be provisioned for the possible spill-over of the pulse shaping filter envelope for example.

In another example, the modulated sequence symbols may be mapped onto subcarriers. A long sequence length may be desirable to increase the number of cyclic shifts, but it may need to balance against the resulting overhead and power consumption. Multiple sets of sequences may be defined, with each set having a unique root sequence and an equal number of cyclic shifts. Although the cyclic shifted sequences obtained from the same root sequence may provide ideal cross correlation, equivalent sequences from different root sequences may have suboptimal performance.

In another example, the sequence transmission may allow simultaneous detection, for example in the frequency domain, of multiple transmissions using different cyclic shifted sequences generated from the same root ZC sequence. The measuring node may detect all simultaneous interference transmissions by observing corresponding peaks above a detection threshold at an output of an Inverse Fast Fourier Transform (IFFT) in different intervals using one root sequence in the correlation. A peak of the IFFT output in interval i may corresponds to the $i^{th}$ cyclically shifted sequence and its delay may be given by the position of the peak in the interval.

In another example, distance between mBs in the range of 300-350 meters may have a minimum of 118 decibels (dBs) of free space path loss and an internal noise level over 1 GHz bandwidth is −84 decibels over milliwatts ratio (dBm). Accordingly, the measurement sequence may be designed with an energy per symbol over the noise density (Es/No) requirement to achieve a satisfactory sequence detection performance.

By way of example, a measurement duration may be set at 400 micro seconds (μs), which may be equivalent to six symbols), and the resulting sub carrier spacing may be $1/400 \times 10^{-6} = 2.5$ kHz. A six radio bearer (RB) allocation may result in 432 subcarriers to accommodate as many sequence symbols. The sequence length may be reduced to the maximum prime number smaller than 432 if using a ZC sequence. Assuming a cyclic shift size, $N_{cs}$, equal to 10, one root sequence may generate 40 sequences and an interference measurement may be able to measure and distinguish up to 40 transmitters at the same time. The link budget may be considered to determine if this sequence length meets the required detection performance in terms of, for example, the detection rate of an interferer when it is a defined range transmitting at a defined power level.

Procedures may be used for link failure detection and link re-acquisition. The link between the nodes may be lost when the control packet is not decoded. By way of example, a Node 1 may transmit a control packet to Node 2, but Node 2 may not respond to the packet. In this case, a link re-acquisition procedure may be applied, such as the procedure described below.

Figure 13:
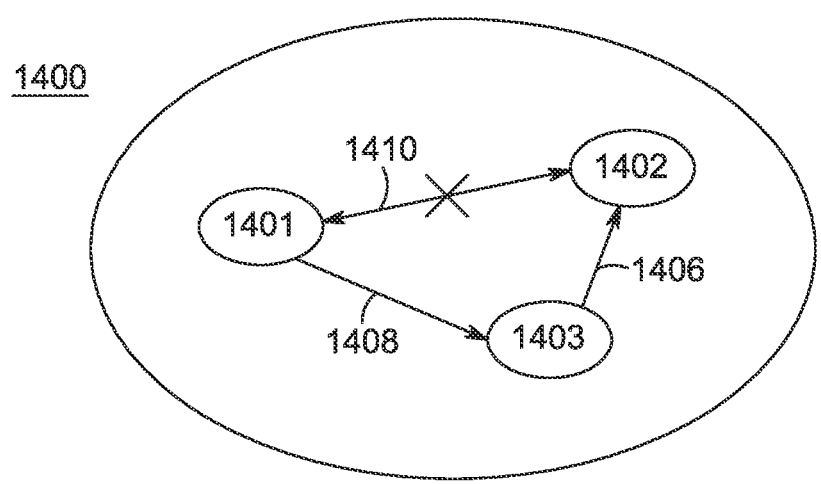
FIG. 13 is a signaling diagram of an example link re-acquisition scheduling procedure between nodes via a neighbor node.

According to an embodiment, explicit scheduling of beam re-acquisition may be used during the data transmission period following the control link failure, by signaling between the affected nodes using intermediate nodes. FIG. 13 is a signaling diagram of an example link re-acquisition scheduling procedure 1400 between nodes 1401 and 1402 via a neighbor node 1403. In the example of FIG. 13, a failure has occurred on the 1410 between node 1401 and node 1402. The node 1401 may inform its one-hop neighbor node 1403 regarding the link re-acquisition slot allocation for node 1402 using beam scheduling on link 1408. If node 1403 is a one-hop neighbor of node 1402, it may directly inform node 1402 of node 1401's link re-acquisition scheduling request using beam scheduling on link 1406. If not, node 1403 may pass the scheduling information to node 1402 via a multi-hop transmission.

Figure 14:
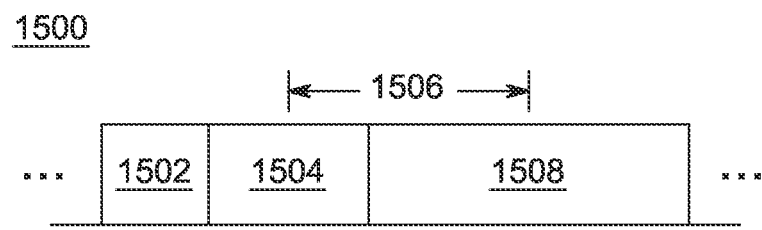
FIG. 14 is a block diagram of an example frame structure for link re-acquisition scheduling with a predefined offset.

According to another embodiment, the nodes may wait an offset time after each packet failure to start beamforming training. In this case, each node may have a pre-defined timing offset available to it and in case a control packet is lost between a pair of nodes, the pair of nodes may schedule (time of failure+offset) slot for the link re-acquisition procedure. FIG. 14 is a block diagram of an example frame 1500 structure for link re-acquisition scheduling with a predefined offset 1506. The frame 1500 may include a beacon 1502, control information 1504 and data 1508. The offset time 1506 occurs after a packet failure.

Figure 15:
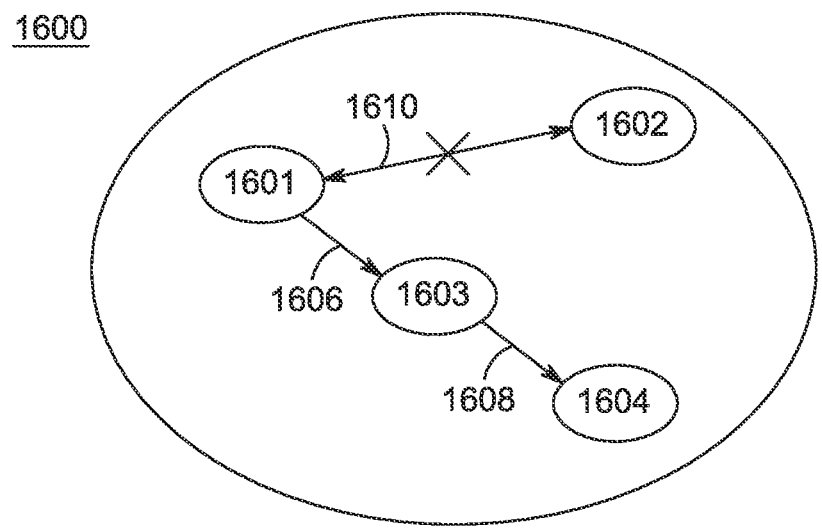
FIG. 15 is a signaling diagram of an example of an inactive neighbor associating procedure in the event of a link failure.

FIG. 15 is a signaling diagram of an example of an inactive neighbor associating procedure 1600 in the event of a link failure. In case of a link failure on link 1610, node 1601 may wish to establish a link to another neighbor node. For example, the neighbor node may be an inactive node 1604, such that node 1601 and node 1604 may have gone through a beam-forming procedure but a link has not been established between them. In case of the failure of link 1610 between node 1601 and node 1602, node 1601 may initiate a link acquisition procedure with node 1604. For example, node 1601 may send the control message, including for example slot information for link association, to the inactive neighbor node 1604 through other neighbors such as neighbor node 1603, over links 1606 and 1608. Alternatively, node 1601 may monitor the beacon transmission of the inactive node 1604 during the beacon transmission interval and the nodes 1601 and 1604 may go through new node association procedures.

According to an embodiment, link maintenance procedures may be based on interference or channel degradation. Mechanisms may be used to screen the link quality at each node and actions may be based on possible link degradation. In a conventional mesh backhaul system, the nodes may perform beam training with their neighbors and corresponding refined beams may be used to transmit high data rate traffic.

Figure 16:
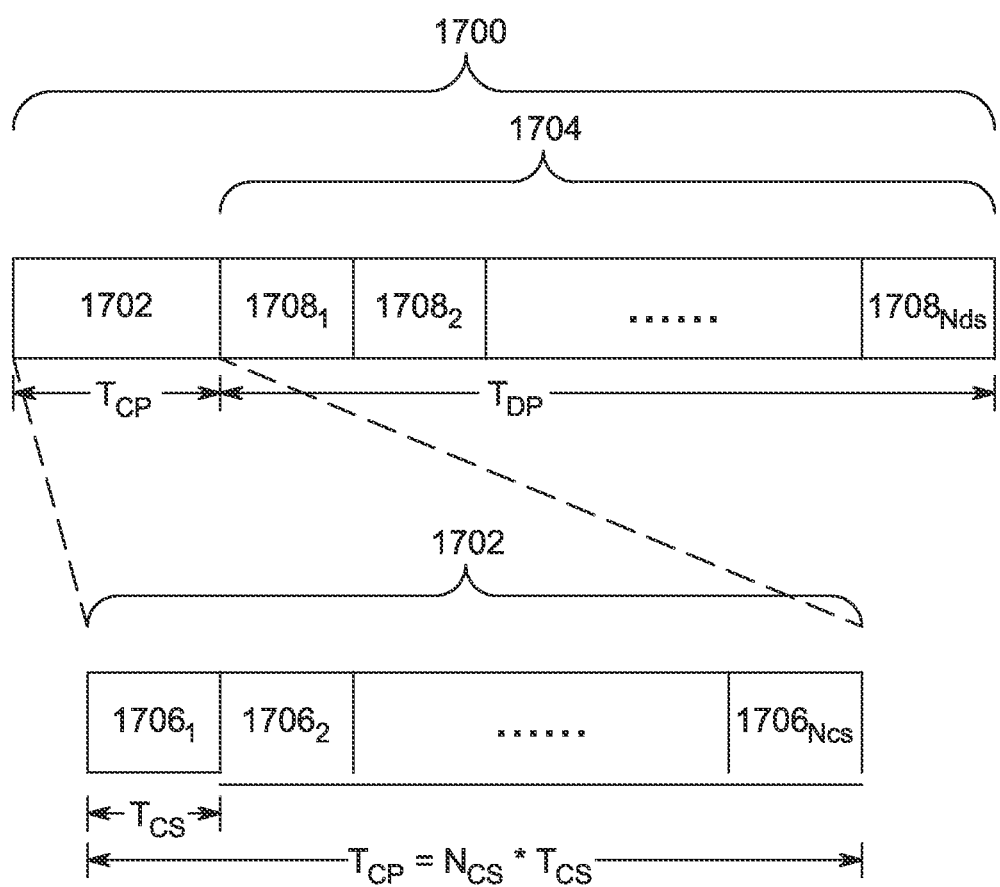
FIG. 16 is a block diagram of an example frame formatted to manage link scheduling and carry traffic.

FIG. 16 is a block diagram of an example frame 1700 formatted to manage link scheduling and carry traffic. The control period 1702 in a frame 1700 may contain $N_{CS}$ number of time slots $1706_1 \ldots 1706_{NCS}$, where each slot may have a time duration of $T_{CS}$. The data period 1704 of frame 1700 may include $N_{ds}$ time slots $1708_1 \ldots 1708_{Nds}$. The control period 1702 may have a duration of $T_{CP}=N_{CS} \times T_{CS}$. During each slot $1706_1 \ldots 1706_{NCS}$, node pairs in the mesh network may exchange scheduling information, unidirectional channel quality indicator (CQI) messages and/or a frame check sequence (FCS) to determine any potential errors in the control slot exchange with each neighbor. The data period 1705 may have duration of $T_{DP}$.

For link screening and failure detection, each node may check a predetermined number of control slots, $N_S$, to observe the CQI change and FCS outcome per slot. Using the aggregated results, each node may identify a link as degraded before the link is completely lost. For example, a node may identify a link as degraded if K CQI measurements out of the last $N_S$ control slots are below a predetermined threshold, $CQI_{TH}$, or of L cyclic redundancy check (CRC) results out of the last $N_S$ control slots have error outputs. If either of these conditions is observed, then the receiving node may identify potential link loss of the incoming channel and may convey a channel degradation message to the transmitting node.

As part of link maintenance, once node pairs detect link failure, the upper layer may be immediately informed regarding the loss of the link. A path selection mechanism, which may be for example hop-by-hop, may not take into account the failed link. The nodes may wish to reacquire the degraded link by either pursuing a beam refinement procedure or initiating a new node discovery procedure based on the availability of other potential neighbor links. If a node has no active links to other neighbor nodes after losing the connection, the node may move into the neighbor discovery state as a new node joining to the network. The node may go through the neighbor discovery procedure. To minimize the beam refinement procedure duration, the nodes may initially search for the beams that provided higher gains in the previous measurement campaign.

Alternatively, if a pair of nodes experiencing a degraded or failed link has active links to other neighbors, either of the nodes may determine the beam refinement initiation time and duration during the data period. The timing information may be conveyed to the other node using the active connections to the existing neighbor nodes via a beam refinement request message. If the nodes do not have a common neighbor node, then the beam refinement request message may be transmitted via multi-hop transmission to the other node. During the beam refinement period, the nodes may carry out a beam alignment protocol to maximize the signal to noise ratio (SNR) value. If the link is not recovered during the beam refinement process, then the nodes may drop each other from the neighbor list. The neighboring nodes may be informed regarding the measurement campaign and duration to avoid potential interference during data transmission.

Procedures may be used to detect channel blockage and interference. The channel degradation may be due to a drop in the channel gain or interference observed during simultaneous transmission of other node pairs. Using the aggregated CQI and CRC outcomes obtained during the control period of each frame, the nodes may predict the source of the link failure and act accordingly. The control slot allocation of neighboring nodes in a cluster may be designed such that interference due to simultaneous transmission may be minimized and/or ignored. Hence, a node that receives continuous error messages from the multiple control packets, or CQI results below a threshold, may identify the reason as misalignment in the beams and a drop in the effective SNR value. In this case, the beam refinement or neighbor discovery procedures, such as those described above, may be triggered.

Alternatively, a node may identify the presence of interference if the control slots are received successfully, whereas the data transmission may start to result in erroneous reception during the data period. The particular durations in the data period where data is not decoded correctly are marked as interfered durations. This information may be conveyed to the OAM center which may trigger resource orthogonalization using, for example, the interference management procedure described in FIG. 17.

Figure 17:
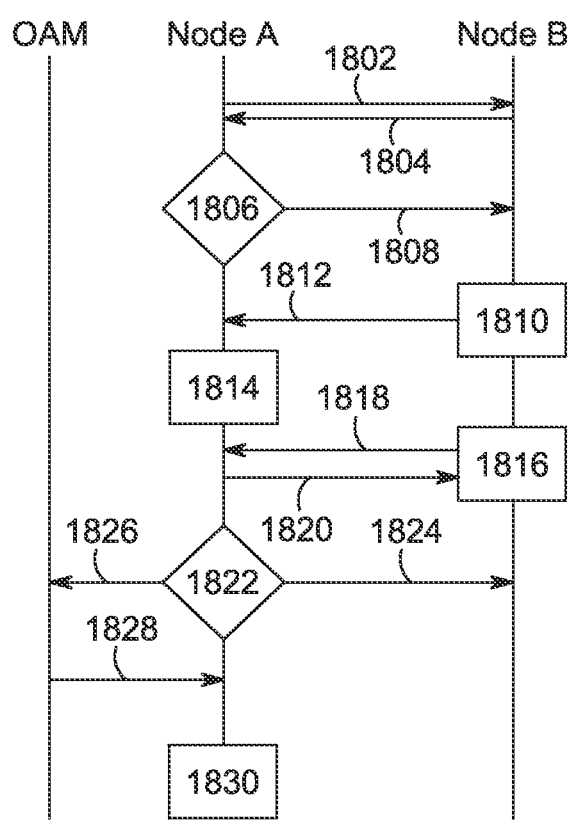
FIG. 17 is a flow diagram of an example link failure detection procedure.

FIG. 17 is a flow diagram of an example link failure detection procedure 1800, involving Node A, Node B and the OAM center. Node A may send $N_{CS}$ control packets to Node B during a control period of a frame, 1802. The Node B may acknowledge the receipt of the control packets to Node A, 1804. Node A may determine if the channel with Node B has degraded, 1806, and send a message to Node B, 1808. For example, Node A may verify if K control slots have an interference that is below a threshold CQI or an erroneous CRC. If the channel is determined to be degraded, message 1808 will include a channel degradation message.

Node B may then determine a beam refinement initiation time and duration during a data period, 1810. Otherwise, Node A may initiate data transmission via message 1808, and perform data communication, 1816, with Node A including transmission, 1818, to Node A and reception, 1820, from node A.

Node A may monitor for error during data transmission, 1822. If an error is detected, Node A may identify the pattern and inform the OAM center, 1826. The OAM center may provide the interfering Node ID, if any, via a message, 1828, to Node A, and Node A may perform interference measurement and resource orthogonalization, 1830. If an error is not detected by Node A, 1822, then Node A may send a message, 1824, to Node B to indicate either channel degradation or to notify Node B to continue to pursue data transmission.

Procedures for interference management are described below. According to an embodiment, distributed orthogonalization of communication resources may be used. By way of example, Node 1 may receive the scheduling information, including for example a bitmap of the neighbor nodes for the upcoming data transmit period. The neighbor nodes may send the relevant column and rows of the interference matrix corresponding to Node 1's transmission. Utilizing the received scheduling bitmap from the neighbor nodes, Node 1 may identify available transmission slots and may schedule its transmission for these slots.

Utilizing the received interference information from the neighbors and/or the received neighbor node bitmaps, Node 1 may identify the transmission slots may create interference to these neighbor nodes below a predetermined threshold. Utilizing its own interference matrix, Node 1 may identify whether the neighbor nodes create interference above the predetermined threshold during the scheduled time slots. Depending on the interference values, Node 1 may decide to schedule its transmission and similarly inform its neighbor nodes regarding its receive availability at these slots.

Figure 18:
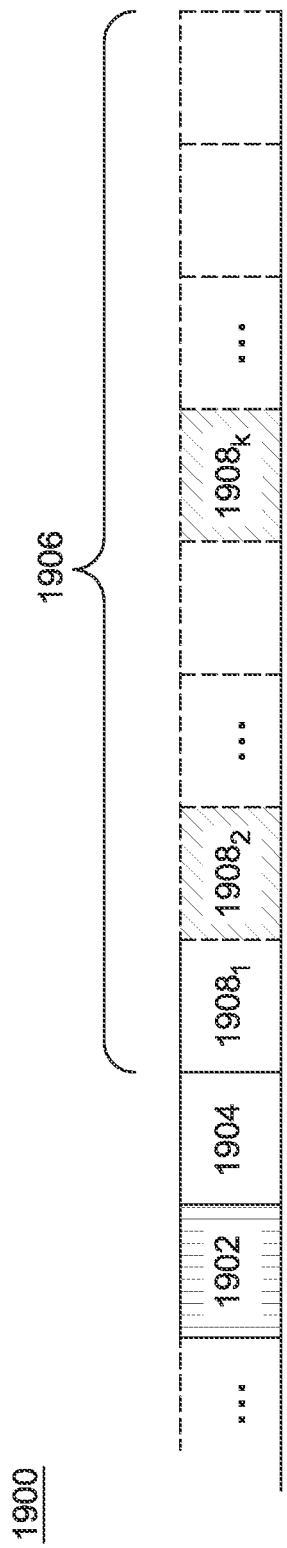
FIG. 18 is a block diagram of an example frame structure for distributed resource orthogonalization.

Based on the scheduling and interference matrix, Node 1 may identify how much interference it would observe during particular transmission slots and may determine its transmit modulation and coding scheme (MCS) for the upcoming scheduling opportunity accordingly. FIG. 18 is a block diagram of an example frame 1900 structure for distributed resource orthogonalization, for Node 1. The frame 1900 may include a beacon 1902, a control period 1904, and a data period 1906 with time slots $1908_1, 1908_2, \ldots 1908_K, \ldots$. In the example of FIG. 18, Node 1 may not schedule transmission during time slots $1908_2$, $1908_K$ in order to allow interfering neighbors to carry out communication.

Figure 19:
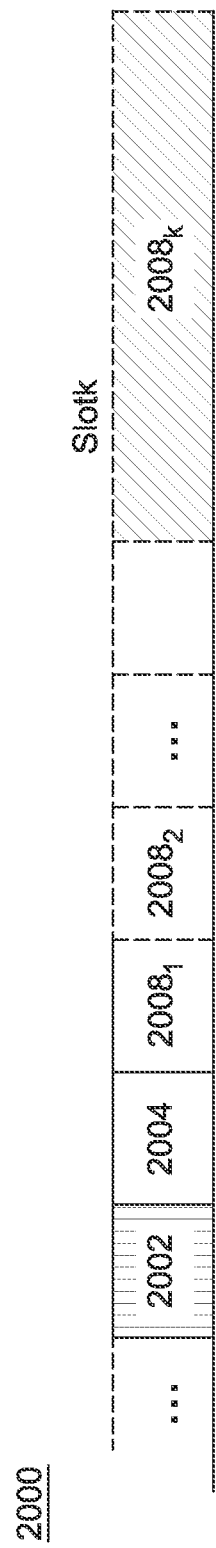
FIG. 19 is a block diagram of an example frame structure for distributed implicit resource orthogonalization.

According to an embodiment, distributed implicit orthogonalization of resources without a schedule exchange may be achieved by identifying separate resource sub-blocks. For example, using the interference matrix, each node may identify neighbor nodes that create above the threshold interference. A node may split the transmission opportunity period into orthogonal sub-periods, where each sub-period is composed of multiple transmission slots. The node may assign each highly interfering neighbor node to orthogonal sub-periods. Each node may be allowed to select its scheduling from the orthogonal sub-periods, hence eliminating the interference among them. The node may inform its neighbors regarding the sub-period assignment via control messaging. FIG. 19 is a block diagram of an example frame 2000 structure for distributed implicit resource orthogonalization, for Node 1. The frame 2000 may include a beacon 2002, a control period 2004, and a data period 2006 with time slots $2008_1, 2008_2, \ldots 2008_K$. In the example of FIG. 19, Node 1 may transmit to its neighbors during time slots $2008_1, \ldots 2008_{K-1}$ only. Time slot $2008_K$ may be assigned to interfering nodes for transmission.

It is possible that the nodes that do not individually create interference that is above the predetermined threshold, may end up creating interference above the threshold by simultaneous transmission due to additive interference. Such a node may be able to identify the nodes with which it is creating additive interference, referred to as simultaneous interfering nodes, and may notify the simultaneous interfering nodes to prevent simultaneous operation. For example, similar to the single interfering node case, the interfered node may inform the simultaneous interfering nodes regarding their additive interference effect and may send a reserved message to reserve a particular portion of the data scheduling period so that they do not simultaneously schedule this portion. The reserved message may identify that only simultaneous operation by these nodes creates interference over the threshold. Hence, if the interfering nodes have sufficient information regarding each other, for example whether they are already assigned to orthogonal data scheduling slots, then either of these nodes may still use the portion reserved by the interfered node.

In a robust and centralized interference management approach, each node may initially identify the Node ID of the interfering nodes. This information may be broadcast to the cluster the node resides in. Hence, the nodes in the cluster may determine the interfering transmit/receive node pairs. Using this information, the data scheduling period may be divided into orthogonal portions, where each node may be assigned to a particular portion based on the interfering list.

From interference matrix (IM) FIG. 4, each node may identify individually interfering nodes as well as group(s) of nodes that jointly create above the threshold interference. This interference list may be broadcast to the cluster and each node may identify the interfering nodes in the cluster. From this list, the cluster may be divided into sets, where each set may contain the nodes that interfere with each other. For example, a node in any set may interfere with the other nodes in the same set, although the interference may or may not be bidirectional interference. The data scheduling interval may be partitioned to the element size of the maximum set in the cluster. Each transmission may be placed in the sets such that the nodes in any partition do not interfere with each other (i.e. there is no one-to-one interference) and the nodes with additive interference above the threshold are not simultaneously placed into the same partition. The placement of the nodes in each set may be determined based on the Node IDs. For example, the smallest Node ID may be assigned to the first orthogonal scheduling period and the node with the following Node ID may be assigned to the next scheduling period, and so on.

According to another embodiment, interference randomization may be achieved via scheduling. The interfering pairs of nodes may schedule their links by performing a random transmit slot selection procedure to minimize the effect of interference. The nodes in the black-list may request power adjustment to minimize the effect of interference. The power adjustment request may include a beam shape adjustment request.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for interference measurement in a mesh network of nodes, performed by a centralized node, the method comprising:
    partitioning the nodes in the mesh network into a plurality of non-overlapping clusters based on topology information of the mesh network and distance between the nodes in the mesh network, wherein nodes within a non-overlapping cluster can decode each other's beacon transmissions;
    receiving interference measurement reports from the nodes in the mesh network;
    generating a plurality of edge clusters, wherein each of the plurality of edge clusters includes at least one node in each of two adjacent non-overlapping clusters that observe mutual interference above a predetermined threshold;
    generating an interference measurement schedule for the plurality of non-overlapping clusters and the plurality of edge clusters, wherein interference is measured on the plurality of edge clusters before interference is measured on the plurality of non-overlapping clusters, and wherein interference is measured in parallel on the plurality of non-overlapping clusters;
    sending cluster membership information for the plurality of non-overlapping clusters and the plurality of edge clusters and the interference measurement schedule to the nodes in the mesh network;
    receiving by the centralized node, from a first node, a notification of an error during data transmission to a second node; and
    in response to the received notification, the centralized node triggering the first node to perform resource orthogonalization.

2. The method of claim 1, wherein the centralized node is an operations and maintenance (OAM) center.

3. The method of claim 1, wherein the interference measurement schedule identifies an interference measurement frame (IMF) for each of the plurality of non-overlapping clusters and each of the plurality of edge clusters.

4. The method of claim 3, wherein the nodes in the mesh network communicate using directional beams, and wherein each IMF includes at least one of the following: an interference level, a reception beam direction, an identifier of a transmitting node, a transmit beam direction, a measurement time slot, a reception beam identifier, and a transmit beam identifier.

5. The method of claim 1, further comprising:
    receiving a cluster update request from a node in the mesh network, wherein the cluster update request indicates one of: a new node joining the mesh network, or a node in the mesh network with an interference level below a threshold for its respective cluster;
    updating cluster membership based on the received cluster update request; and
    sending notification of the updated cluster membership to at least one node in the mesh network.

6. A centralized node configured to perform interference measurement in a mesh network, the centralized node comprising:
    a processor configured to partition the nodes in the mesh network into a plurality of non-overlapping clusters based on topology information of the mesh network and distance between the nodes in the mesh network, wherein nodes within a non-overlapping cluster can decode each other's beacon transmissions;
    a receiver configured to receive interference measurement reports from the nodes in the mesh network;
    the processor configured to generate a plurality of edge clusters, wherein each of the plurality of edge clusters includes at least one node in each of two non-overlapping clusters that observe mutual interference above a predetermined threshold;
    the processor configured to generate an interference measurement schedule for the plurality of non-overlapping clusters and the plurality of edge clusters, wherein interference is measured on the plurality of edge clusters before interference is measured on the plurality of non-overlapping clusters, and wherein interference is measured in parallel on the plurality of non-overlapping clusters;
    a transmitter configured to send cluster membership information for the plurality of non-overlapping clusters and the plurality of edge clusters and the interference measurement schedule to the nodes in the mesh network;
    the receiver of the centralized node configured to receive, from a first node, a notification of an error during data transmission to a second node; and
    in response to the received notification, the transmitter of the centralized node configured to trigger the first node to perform resource orthogonalization.

7. The centralized node of claim 6 configured as an operations and maintenance (OAM) center.

8. The centralized node of claim 6, wherein the interference measurement schedule identifies an interference measurement frame (IMF) for each of the plurality of non-overlapping clusters and each of the plurality of edge clusters.

9. The centralized node of claim 6, wherein the nodes in the mesh network communicate using directional beams, and wherein each IMF includes at least one of the following: an interference level, a reception beam direction, an identifier of a transmitting node, a transmit beam direction, a measurement time slot, a reception beam identifier, and a transmit beam identifier.

10. The centralized node of claim 6, wherein:
    the receiver is further configured to receive a cluster update request from a node in the mesh network, wherein the cluster update request indicates one of: a new node joining the mesh network, or a node in the mesh network with an interference level below a threshold for its respective cluster;
    the processor further configured to update cluster membership based on the received cluster update request; and
    the transmitter configured to send notification of the updated cluster membership to at least one node in the mesh network.

* * * * *